Aug. 2, 1960    G. F. HAUSMANN    2,947,139
BY-PASS TURBOJET
Filed Aug. 29, 1957    2 Sheets-Sheet 2
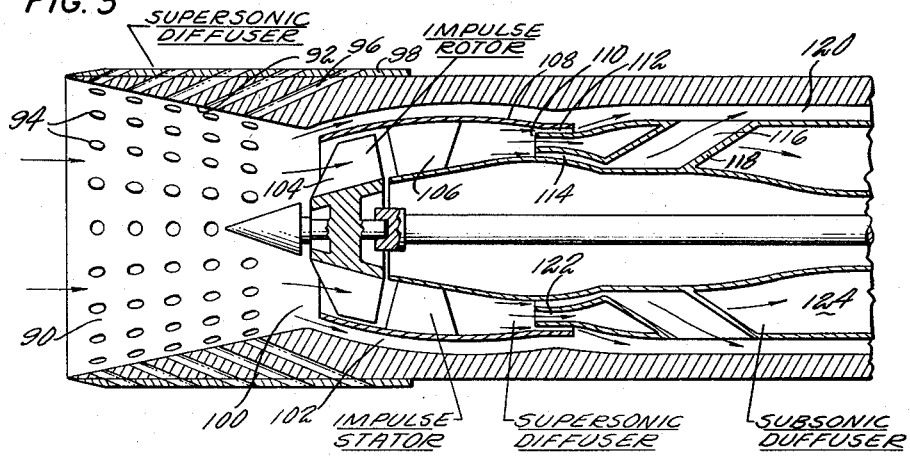
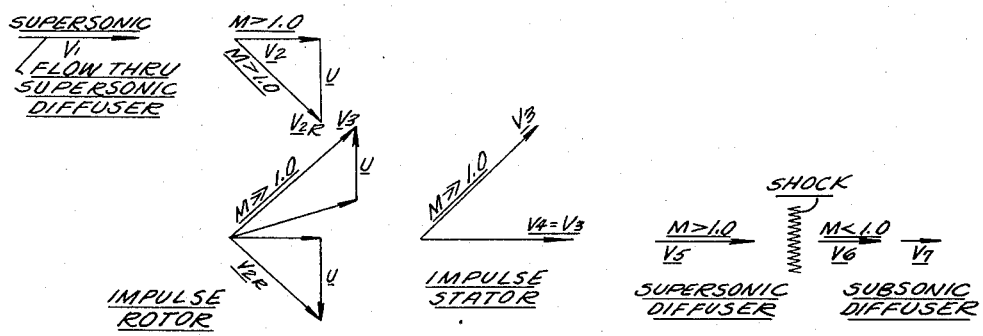
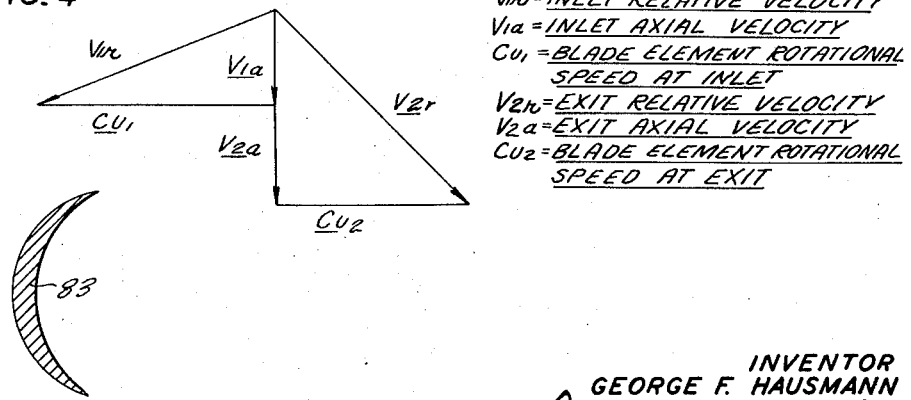
$V_{ir}$ = INLET RELATIVE VELOCITY
$V_{ia}$ = INLET AXIAL VELOCITY
$Cu_1$ = BLADE ELEMENT ROTATIONAL SPEED AT INLET
$V_{2r}$ = EXIT RELATIVE VELOCITY
$V_{2a}$ = EXIT AXIAL VELOCITY
$Cu_2$ = BLADE ELEMENT ROTATIONAL SPEED AT EXIT
INVENTOR
GEORGE F. HAUSMANN
BY Leonard F. Wakelin
ATTORNEY

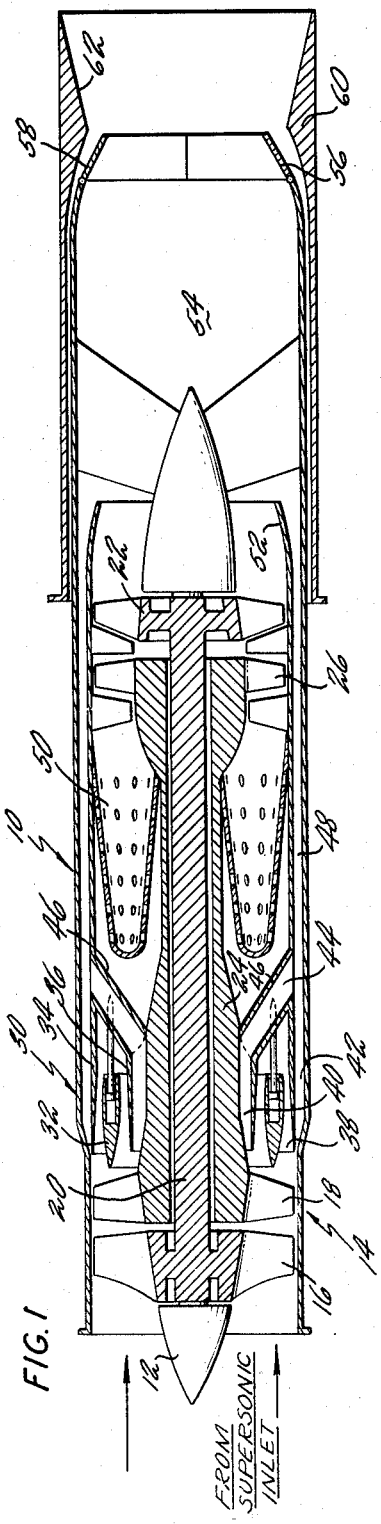

United States Patent Office 2,947,139
Patented Aug. 2, 1960

2,947,139
BY-PASS TURBOJET

George F. Hausmann, Glastonbury, Conn., assignor to United Aircraft Corporation, East Hartford, Conn., a corporation of Delaware Filed Aug. 29, 1957, Ser. No. 681,105

13 Claims. (Cl. 60—35.6)

This invention relates to power plants and more particularly to high performance power plants having impulse-type supersonic compressors.

The use of supersonic compressors in turbojet engines offers the potential advantages of light weight because of the high work output per stage and high flow per unit area because of the ability of the supersonic compressor to accommodate high axial velocities. The primary disadvantage of conventional supersonic compressor systems of either the shock-in-rotor or shock-in-stator type is the relatively low efficiency which results from shock boundary layer interactions within the blading. In the engines described herein, it is proposed to transmit only kinetic energy to the flow within the blading by the use of an impulse rotor or possibly impulse rotor, impulse stator combinations and to convert the axial kinetic energy to static pressure in an axisymmetric annular supersonic diffuser which is stationary with respect to the basic engine structure. Impulse rotors of the type required for this application have been operated with extremely high efficiencies as have impulse stator passages. Furthermore, data is available to permit the design of highly efficient variable geometry annular supersonic diffusers. It is believed that an impulse compressor and supersonic diffuser combination of the type described can provide compression ratios as high as 6 or 7 with adiabetic efficiencies which approach those of multi-stage subsonic compressors. It is believed that the supersonic impulse system will be lighter, shorter, and more adaptable to supersonic propulsion systems than the contemporary compressor types.

It is therefore a primary object to provide a short, lightweight, high compression compressor which can operate over a wide range of flight speeds with either subsonic or supersonic relative velocities.

It is a secondary object to combine inlet ram compression and compressor compression such that flow is decelerated to subsonic speeds at only one point in system.

It is a further object of this invention to provide a power plant with an impulse type rotor for accelerating the subsonic or supersonic air entering the power plant and subsequently increasing its static pressure through a stationary annular supersonic diffuser to efficiently convert the energy in the air.

It is a still further object of this invention to provide a power plant having the features described above including a boundary layer by-pass which is combined with the exhaust flow at a downstream point in the power plant.

These and other objects of this invention will become readily apparent from the following description of the drawings in which:

Fig. 1 is a schematic illustration of the power plant according to this invention;

Fig. 2 is an enlarged illustration of the supersonic diffuser shown in Fig. 1;

Fig. 3 is an enlarged schematic of the mechanism for varying the diffuser geometry;

Fig. 4 is a vector diagram of the flow through the rotor and diffuser shown in Fig. 2;

Fig. 5 is a partial illustration of a power plant including another embodiment of this invention; and Fig. 6 is a vector diagram of the flow characteristic at various points of the power plant illustrated in Fig. 5.

Referring to Fig. 1, a power plant embodying this invention is generally illustrated at 10. The air flow into the power plant is received by a supersonic or subsonic inlet (not shown) of any suitable type. The air flows from the supersonic inlet past the nose cone 12 and into the supersonic impulse rotor generally indicated at 14. The supersonic impulse rotor comprises a pair of counter-rotating rotor stages 16 and 18. A different impulse rotor is described in connection with Fig. 5. The impulse stage 16 is driven by a shaft 20 which, in turn, is driven by a turbine stage 22. The second impulse stage 18 is driven by a shaft 24 by a first stage turbine 26. The use of a supersonic counter-rotating impulse rotor (but not limited thereto) provides an efficient means for accelerating the air without necessarily increasing the pressure at this stage of the power plant cycle.

Immediately downstream of the impulse rotor there is provided an annular spike diffuser 30. The annular diffuser includes a movable spike 32 which cooperates with the inner and outer walls 34 and 36 to form an annular convergent-divergent passage 38. The walls 34 and 36 also define inner and outer annular passages 40 and 42 for scooping off the boundary layer flow along the inner and outer walls of the main air passage leading from the impulse rotor. This boundary layer air is conducted via the passage 44 in the hollow strut 46 and the outer passage 48 adjacent the outer casing of the power plant. This boundary layer air is then conducted through the passage 48 and is mixed downstream with the exhaust gases from the power plant. Air from the supersonic annular spike diffuser then flows to the combustion section 50 where it is suitably burned with fuel which is fed from a suitable source. The burned gases are then passed through the turbine stages 22 and 26 and then conducted through a nozzle 52 to an exhaust chamber 54. As chamber 54 may represent an afterburner section of any suitable type, additional fuel may be injected into the afterburner section 54 where the boundary layer air is also intermixed. Downstream of the afterburner there may be provided a pair of eyelids 56, 58 which, in the position shown, forms a convergent portion of a nozzle. The eyelids 56, 58 may be movable to an open position where they will almost abut the outer wall of the main nozzle structure 60. The main nozzle downstream of the eyelids 58 comprises a divergent section 62 so that between eyelids 58 and the downstream portion 62, there is presented to the air stream a convergent-divergent super exhaust nozzle.

The spike 32 shown in Fig. 1 may be moved axially as shown in Fig. 3. As shown herein, the spike 32 includes one or more cylindrical portions 66 in which are positioned one or more pistons 68. The piston 68 includes fluid passages 70 and 72 which lead to the chambers on either side of the piston 68. Either pressure or drain fluid may be fed to the passages 70, 72 by a suitable selector valve 74 to thereby move the annular spike 32 either forward or aft to vary the geometry of the supersonic annular diffuser passage 38.

The annular supersonic diffuser passage 38 is better shown in Fig. 2. Here again, the variable annular spike 32 is purely illustrated as being suitably mounted on one or more support members 78. The support members 78 may be distributed annularly or they may be replaced by a cylindrical member. In any event, the support members 78 are connected to the hollow struts 46. It is clearly seen that the annular spike 32 then will cause a shock wave to be generated, as at 80, downstream of which the air is found compressed through the convergent-divergent diffuser. The air then passes from the diffuser past the strut 46 and into the combustion chamber 50.

Fig. 2 is illustrated as having a single-stage supersonic impulse rotor 82 rather than the counter-rotating two-stage impulse rotor as is illustrated in Fig. 1. For purposes of this invention the counter-rotating two-stage impulse rotor may have a higher total pressure ratio than the single stage but in any event the impulse rotor is an important element to the combination.

Thus, the main energy conversion in this power plant arrangement is obtained in the supersonic annular diffuser which is located downstream of the impulse rotor. The flow through the single-stage impulse rotor 82 is diagrammatically illustrated by vectors in Fig. 4. A typical blade 83 is shown in Fig. 4 and the vectors illustrate the flow therein. At the design condition, the inlet axial velocity is represented by the vector $V_{1a}$, which can be subsonic or supersonic. The rotor speed, Cu, is combined with the axial velocity, $V_{1a}$, to provide the supersonic resultant inlet velocity, $V_{1R}$, which is essentially tangent to the upper surface of the blade leading edge. Within the impulse rotor, the flow is turned (without change in pressure or velocity) to an angle which would provide an axial absolute velocity when the rotor speed is subtracted from the relative blade exit vector. In this process, the axial velocity is increased to a high supersonic value, $V_{2a}$, with no change in pressure. (This is made possible by adjusting the height of the passage along the blade chord.)

Fig. 5 illustrates another embodiment of the main principles of this invention. Thus, as shown herein, a supersonic diffuser section is illustrated at 90. The supersonic diffuser includes a convergent section 92 which may include a plurality of perforations 94 which lead to bleed passages 96. The bleed passages may be opened or closed by a sleeve 98 in the manner shown and claimed in patent application Serial No. 336,746 of George F. Hausmann, filed February 13, 1953, and now Patent No. 2,861,419 issued November 25, 1958. The supersonic flow in the convergent portion is decelerated until it reaches the throat section 100. At this point the boundary layer air which has built up along the walls of the diffuser is bled off through the annular passage 102. The main high energy flow is then intercepted by a supersonic impulse compressor which comprises rotor 104 and a stator 106. The impulse compressor further increases the velocity of the air without increasing the pressure thereof. Downstream of the rotor the flow is further converged to again decrease its velocity. To this end the convergent section 108 is provided to act as a supersonic diffuser. At the throat 110 of this supersonic diffuser the flow along the outer and inner walls is bled off via the passages 112 and 114, and the central portion of the supersonic flow at the throat is diffused to a subsonic velocity by a normal shock diffuser. The flow from the passage 114 is conducted through the hollow portion 116 of the strut 118. All of the boundary layer flow from the throat 100 and from adjacent the throat 110 is conducted by a bypass passage 120. The high energy flow adjacent the throat 110 of the supersonic diffuser 108 is intercepted by the main annular passage 122. The flow from the passage 122 is then diffused in the subsonic diffuser 124 from whence it is conducted to the combustion chamber.

The velocity stages of the air being worked in the various stages of the power plant inlet and rotor shown in Fig. 5 are best illustrated by the vector diagrams shown in Fig. 6. These diagrams are identified to show the flow at the various stages.

As shown in Fig. 6, a high-performance, variable-geometry supersonic inlet (such as the perforated, sleeve inlet shown) is used to partially compress the supersonic inlet flow, $V_1$, to a lower supersonic velocity $V_2$. This velocity, in combination with the rotor rotational component, V, provides the resultant rotor velocity, $V_{2R}$, which is a higher supersonic velocity than $V_2$. The impulse rotor increases the total pressure at essentially constant static pressure with resultant high efficiency. The rotor exit flow, $V_3$, which is higher than $V_{2R}$ is turned to the axial direction ($V_4$) by an impulse stator which also has high efficiency. The supersonic axial flow, $V_4$, is then converted to static pressure by an annular supersonic diffuser. Since the principal losses are incurred by the normal shock having the low approach Mach number $M_5$, the over-all compression process can be more efficient than that obtained by other arrangements where the rotor approach flow is first shocked down in a conventional supersonic inlet. Furthermore, the flow per frontal area of the rotor can approach the limiting value of 49.1 lb./ft.$^2$ because of the ability of the rotor to accommodate a supersonic axial flow.

As a result of this invention, it is apparent that an efficient light-weight propulsion system has been provided which is particularly adaptable to supersonic flight speeds. A relatively high pressure ratio can be obtained with only one or two stages of compression and a high efficiency is obtained by applying boundary layer control and other known principles to the stationary annular supersonic diffuser component of the compressor. Furthermore, it may be possible to locate the rotor stage within the throat of the main supersonic inlet and thereby obtain a lower weight and higher efficiency than could be obtained by the more conventional placement of the compressor at the end of the subsonic diffuser portion of the main supersonic inlet.

Although several embodiments of this invention have been illustrated and described herein, it will be apparent that various changes and modifications may be made in the construction and arrangement of the various parts without departing from the scope of this novel concept.

What is desired by Letters Patent is:

1. An air breathing turbine type power plant including a supersonic convergent inlet, said inlet having a throat in which air flows at supersonic velocity, an impulse rotor located in the throat of said inlet whereby the air is accelerated and discharged at supersonic velocity, a supersonic convergent diffuser downstream of said rotor and having a throat, a subsonic divergent diffuser downstream of said supersonic diffuser, and means for bleeding off the low energy boundary layer at each of said throats.

2. An air breathing power plant having an air inlet, a first supersonic convergent diffuser receiving air from said inlet at supersonic velocity, a throat at the downstream end of said supersonic diffuser in which the flow is supersonic, an impulse rotor adjacent said throat and receiving supersonic air flow from said diffuser and discharging said air at supersonic velocity, peripherally spaced axial flow blade means downstream of said rotor, a second supersonic convergent diffuser downstream of said stator, and a subsonic divergent diffuser downstream of said second supersonic diffuser.

3. An air breathing power plant having an air inlet, a first supersonic convergent diffuser receiving air from said inlet at supersonic velocity, a throat at the downstream end of said supersonic diffuser in which the flow is supersonic, an impulse rotor adjacent said throat and receiving supersonic air flow from said diffuser and discharging said air at supersonic velocity, an impulse stator downstream of said rotor, a second supersonic convergent diffuser downstream of said stator, and a subsonic divergent diffuser downstream of said second supersonic diffuser.

4. In a power plant having an air inlet, a first supersonic diffuser receiving air from said inlet comprising an unobstructed fixed convergent passage, means for bleeding air from within said supersonic diffuser to the outside thereof, a throat at the downstream end of said supersonic diffuser in which the flow is supersonic, an impulse rotor in said throat and receiving air from said convergent passage, means for bleeding boundary layer air from said throat adjacent the upstream end of said rotor including a first annular passage surrounding said rotor including radially spaced inner and outer walls, said rotor having a hub and a plurality of blades, said hub forming an inner body, said inner wall forming an inner annular passage in cooperation with said hub and encasing said rotor, a fixed annular supersonic diffuser downstream of said rotor and forming a continuation of said inner annular passage, means for bleeding boundary layer air from the inner and outer walls of said annular supersonic diffuser adjacent the upstream end of said annular supersonic diffuser, an annular subsonic diffuser downstream of said annular supersonic diffuser and receiving the main air flow therefrom, and means for mixing the flow from said subsonic diffuser and said boundary layer bleed at a point downstream in said power plant.

5. In a power plant having an air inlet receiving air at supersonic velocities, an impulse rotor receiving air from said inlet and maintaining the velocity of the air therethrough at supersonic velocity, an annular duct downstream of said rotor receiving air at supersonic velocity therefrom, and an annular supersonic convergent-divergent diffuser in said duct, said diffuser including an annular passage which is smaller in area than said duct and is centrally located in said duct whereby a portion of the flow through the duct flows around the inside and outside of said annular passage.

6. An air breathing power plant comprising a forward opening supersonic air inlet generating air flow at supersonic velocity, an axial flow impulse rotor receiving air from said inlet at supersonic velocity and discharging the flow at supersonic velocity, a supersonic convergent-divergent diffuser receiving the core of the air discharged from said rotor, means for bypassing around said diffuser the remaining boundary layer air which surrounds said core of air, a combustion section downstream of said diffuser and receiving air therefrom, a turbine downstream from said combustion section and driven by the gases emitted from said combustion section, and an exhaust nozzle downstream of said turbine for discharging the gases as a propulsive stream from the power plant.

7. In a power plant according to claim 6 wherein said supersonic diffuser includes an annular spike forming a pair of concentric annular diffuser passages.

8. In a power plant according to claim 7 including means for varying the geometry of said annular diffuser passages.

9. An air breathing turbine-type power plant including a supersonic convergent inlet, said inlet having a throat in which air flows at supersonic velocity, an impulse rotor located in the throat of said inlet whereby the air is accelerated and discharged at supersonic velocity, a supersonic convergent diffuser downstream of said rotor, and a subsonic divergent diffuser downstream of said supersonic diffuser.

10. An air breathing power plant comprising a forward opening supersonic air inlet, an axial flow impulse rotor receiving air at supersonic velocity from said inlet and discharging air at supersonic velocity, a supersonic convergent-divergent diffuser receiving air from said rotor, means for bypassing the boundary layer air around said diffuser, a combustion section downstream of said diffuser and receiving air therefrom, a turbine downstream from said combustion section and driven only by the gases emitted from said combustion section, means for combining said bypassed air with the discharge from said turbine, and an exhaust nozzle downstream of said turbine for discharging the combined gases as a propulsive stream from the power plant.

11. In a power plant having an air inlet, a first supersonic convergent diffuser receiving air from said inlet, a throat at the downstream end of said supersonic diffuser, an impulse rotor adjacent said throat and receiving supersonic air flow from said diffuser, a convergent-divergent diffuser downstream of said rotor receiving air at supersonic velocity, means for bleeding boundary layer air from within said convergent-divergent diffuser, a combustion section receiving air from said last-mentioned diffuser, and means for combining the flow from said combustion section and the boundary layer bleed at a point downstream of said combustion section.

12. In a power plant having an air inlet, a first supersonic diffuser receiving air from said inlet, a throat at the downstream end of said supersonic diffuser, an impulse rotor in said throat and receiving air from said diffuser and discharging the air at supersonic velocity, said rotor having a hub and a plurality of blades, said hub forming an inner body, an outer casing forming an annular passage in cooperation with said hub, an annular convergent supersonic diffuser downstream of said compressor and forming a continuation of said first-mentioned annular passage, and an annular subsonic diffuser downstream of said annular supersonic diffuser and receiving air therefrom.

13. In a power plant having an air inlet, a first supersonic diffuser receiving air from said inlet, a throat at the downstream end of said supersonic diffuser, an impulse rotor in said throat and receiving air from said diffuser, said rotor having a hub and a plurality of blades, said hub forming an inner body, an outer casing forming an annular passage in cooperation with said hub, a relatively small outer annular passage surrounding said last-mentioned annular passage for bleeding off boundary layer air from the wall of said casing and adjacent said rotor, an annular convergent supersonic diffuser downstream of said rotor and forming a continuation of said first-mentioned annular passage, a pair of inner and outer passages on each side of said annular supersonic diffuser for bleeding boundary air from the inside and outside walls of the passage leading from said annular passage, and an annular subsonic diffuser downstream of said annular supersonic diffuser and receiving the main airflow therefrom.

References Cited in the file of this patent

UNITED STATES PATENTS

| | | |
|---|---|---|
| 889,506 | Weise | Sept. 10, 1953 |
| 2,672,726 | Wolf et al. | Mar. 23, 1954 |
| 2,689,681 | Sabatiuk | Sept. 21, 1954 |
| 2,788,183 | Ferri | Apr. 9, 1957 |
| 2,790,304 | Besserer | Apr. 30, 1957 |
| 2,811,828 | McLafferty | Nov. 5, 1957 |
| 2,841,952 | Billman | July 8, 1958 |
| 2,853,227 | Beardsley | Sept. 23, 1958 |

FOREIGN PATENTS

| | | |
|---|---|---|
| 671,418 | Germany | Feb. 7, 1939 |
| 724,553 | Germany | Aug. 29, 1942 |
| 579,758 | Great Britain | Aug. 14, 1946 |